United States Patent [19]

Biermann

[11] Patent Number: 5,026,106
[45] Date of Patent: Jun. 25, 1991

[54] TRAM CAR WHEEL

[76] Inventor: Paul Biermann, 14728 - 116 Avenue, Edmonton, Alberta, T5M 3G1, Canada

[21] Appl. No.: 415,021

[22] Filed: Sep. 29, 1989

Related U.S. Application Data

[63] Continuation-in-part of Ser. No. 278,220, Nov. 30, 1988, abandoned.

[51] Int. Cl.⁵ .............................................. B60B 17/00
[52] U.S. Cl. ........................................ 295/1; 295/8; 301/63 PW
[58] Field of Search ...................... 295/1, 8, 11, 15, 17, 295/30, 33, 34, 8.5; 104/87, 112, 197; 301/63 PW; 105/154, 155

[56] References Cited

U.S. PATENT DOCUMENTS

| 2,548,839 | 4/1951 | Coombes | 295/11 |
| 3,452,843 | 7/1969 | Smith | 295/8 X |
| 3,528,706 | 9/1970 | Bauer | 301/65 |
| 3,592,511 | 7/1971 | Hudelson | 301/63 DD |
| 4,217,944 | 8/1980 | Pascal | 301/63 PW X |
| 4,520,733 | 6/1985 | Willmann | 295/33 X |
| 4,716,997 | 1/1988 | Gibson | 104/197 X |

Primary Examiner—Russell D. Stormer
Attorney, Agent, or Firm—Kenyon & Kenyon

[57] ABSTRACT

There is provided a new and useful tram car wheel comprising a metallic hub section, a formed non-metallic wheel on the hub, a pair of cable flanges on the wheel, and an open reinforcing structure in the wheel anchored to the hub section.

33 Claims, 3 Drawing Sheets

TRAM CAR WHEEL

This application is a continuation-in-part of my copending application Ser. No. 278,220, filed Nov. 30, 1988, now abandoned.

This application relates to wheels for tram cars of the type which might run on cables or rails or both.

BACKGROUND OF THE INVENTION

There are a number of areas where aerial or surface trams are an important means of transporting products and materials. A particularly good example is in the mining industry where aerial trams are used to bring ore from mines located in mountainous areas to processing plants at lower more accessible levels. These tram lines may run for many kilometers and carry several hundred tram cars.

Steel wheels have traditionally been utilized on these trams. However, there are a number of problems associated with steel wheels which make some sort of synthetic thermoplastic or natural rubber compound wheels attractive. These include, for example, the fact that steel wheels are much more abrasive and cause much greater cable wear than do synthetic or natural rubber compound wheels. A further very distinct advantage of the non-metallic wheels is that there is cumulatively a very large weight saving in using these wheels, so that a smaller cable size can be utilized.

Unfortunately, very substantial problems have arisen in attempting to develop non-metallic tram wheels. The wheels are subjected to very high stresses because of the weight of the tram car and its contents, the substantial temperature changes frequently encountered, and the manipulation of the car at the ends of the line. These stresses have often resulted in cracking, chipping, breaking and delamination of the non-metallic wheel.

Where wheels have been developed using synthetic running surfaces, these have been composite structures comprising various metal and non-metal parts bolted together. Various causes of failure have been associated with these wheels.

No satisfactory solution has been forthcoming to these problems.

The present invention alleviates these problems by providing a unitary wheel structure which is capable of absorbing stresses from the various noted causes.

PRIOR ART

Applicant is unaware of any specific patent documents which are of any relevance to the present invention.

There are currently on the market a number of composite tram wheels which are not of unitary construction but which comprise a number of parts which require to be secured together as by bolts prior to use.

BRIEF SUMMARY OF THE INVENTION

Applicant has now discovered that a unitary tram wheel can be constructed with suitable reinforcing to maintain the integrity of the wheel and to withstand the stresses encountered in use. A metallic hub is combined with a molded non-metallic wheel structure. The non-metallic wheel structure encompasses an open reinforcing structure. These three components are secured together into a unitary structure.

Accordingly, the invention provides a tram car wheel comprising a metallic hub section, a formed non-metallic wheel on the hub, a pair of cable flanges on the wheel, and an open reinforcing structure in the wheel anchored to the hub section.

GENERAL DESCRIPTION

A thorough understanding of the various types of stresses operating on the tram wheel under various working conditions is required in order to develop a wheel which will provide a good life expectancy at an economical cost. One basic consideration is the weight of the load which must be borne by the wheel and the consequent momentum which is brought to bear on the various parts of the wheel by the changing directions of the forces generated by the load under normal working conditions. A satisfactory wheel is one which will anticipate the changing of forces and their effect and will reconcile the wheel as a whole to these changes.

In dealing with a number of specific strength requirements, the wheel of the present invention ultimately reconciles the various stresses created on it by different force interactions.

Apart from the weight of the load, an extremely important source of stress is temperature change and the differing co-efficients of expansion of the non-metallic wheel and the metallic hub. These stresses are key reasons for delamination problems which have arisen in the past. As well, the effects of different co-efficients of expansion can cause cracking and similar breakdown of the non-metallic part of the wheel.

Further, it is an aim of the invention to manage and benefit from the residual stresses that occur through the polyurethane manufacturing process. This aspect of the invention is utilized to improve modular rigidity and overall structural integrity.

The present invention recognizes that the anchoring of the non-metallic wheel section to the metallic hub is an important consideration. This anchoring is preferably achieved in two ways. First, the hub is coated with adhesive prior to molding of the non-metallic wheel section, so that a good chemical bond is achieved in this way. The primary purpose of the adhesive is to reduce the possibility of shear occurring between the non-metal and the metal reinforcing structure. Second, an inner wheel stabilizing section of a reinforcing structure is provided which is directly anchored to the hub as, for example, by welding, to form a mechanical bond. This structure extends from the hub up into the non-metallic wheel structure to anchor that structure to the hub. In the preferred case the stabilizing section is of perforated metal sheet, an open net structure, or the like, which permits the non-metallic wheel section in the molding process to penetrate the stabilizing structure to thus form a continuous non-metallic structure around the stabilizing structure. The positive anchoring of the stabilizing structure to the hub then holds the non-metallic molded structure in place against the hub.

The reinforcing structure may be designed in such a way that the adhesive is not always necessary.

The stresses caused by the differing coefficients of expansion can also be reduced by providing cavities leading into the thicker part of the non-metallic wheel section. These cavities are useful in two ways. First, they reduce the volume of the solid wheel section through which the expansive stresses would otherwise be magnified, and, second, they permit circulation of air into the interior of the non-metallic wheel to more quickly equalize temperature differences through the structure to thus reduce thermal expansion/contraction stresses.

As well, the inner wheel stabilizing structure is preferably a resilient and compressible structure which will, apart from the section which is anchored to the hub, flex to some extent with the thermal expansion and contraction of the non-metallic wheel section.

In a preferred configuration the inner wheel stabilizing structure comprises a series of cylindrical components made of perforated metal sheet material and arranged with their longitudinal axes parallel to the axis of the wheel. The cylindrical structures are spot welded to the hub along the line of contact. In a preferred configuration the surface of the cylindrical components is flattened and indented adjacent the hub to provide a greater contact surface with the hub. The welding may then be distributed, as, for example, along the edges of the contact surface.

The outer extremity of the non-metallic wheel section; i.e., the running surface, includes flanges which are appropriate to the particular job application. For an aerial tramway these will comprise at least a pair of cable flanges defining an area through which the cable will run. It is generally the case that rail flanges are also required adjacent to the cable flanges, since the tram car will normally run on rails over the cable supporting towers and also in may cases at the ends of the tramline. Both types of flanges are highly vulnerable to breakage because of the magnitude of the stresses imposed and the changing nature of the stresses. For example, the cable flanges are subject to actually splitting off the wheel as a result of the high radial forces which are incident on the wheel between those flanges.

As well, the cable flanges require reinforcing to maintain size stability. The tolerances are fairly tight in the area encompassed by the cable flanges for the following reason. The sleeve connectors which join cable ends have a larger cross section than does the cable. The area between the flanges must be large enough at all temperatures to accommodate this large diameter sleeve but at the same time small enough to avoid wobbling at normal temperatures and at the smaller cable diameter.

With respect to the rail flanges and with particular reference to the mining industry, it is common that tram cars are inverted from the cable to the rails for purposes of emptying their load at the end of the line. There is thus a substantial impact on the rail flanges when the tram car is inverted onto the rails.

To deal with these flange problems the present invention provides an outer flange stabilizing structure which preferably substantially follows the contour of the flanges spaced a short distance inwardly from the surface of the wheel to provide the needed stability. The preferred form is a wave-like configuration which loops up into the cable flanges. Thus the outer flange stabilizing structure may as a whole comprise a ring having a wave-like form across the ring.

In order to create the highly preferred unitary structure, the outer flange stabilizing structure is anchored to the inner wheel stabilizing structure. In the preferred case the innermost parts of the outer stabilizing structure are at the level of the outermost parts of the inner stabilizing structure and the two are spot welded together at points of contact.

The outer flange stabilizing structure is also preferably of perforated metal sheet, although other structures such as an open netting or weave could be utilized. It is of importance that the non-metallic material of the wheel be able to penetrate the reinforcing structure to provide a continuous non-metallic wheel structure around and through the reinforcing structure.

It is also preferred for optimum construction that the stabilizing structures extend over substantially the entire axial length of the wheel, since there are also present very strong axial stresses resulting from various of the factors discussed above, particularly the thermal expansion.

There are also very substantial tangential stresses exerted at the outer extremities of the wheels due mainly to directional changes at loading and unloading. The structure of the inner stabilizing components is designed to be able to yield as required to absorb these stresses.

The perforated metal sheet which is the preferred material of construction for the reinforcing structures, has in the most preferred case about 50 to 60 percent perforations. Obviously the perforations must be sufficiently large to allow the non-metallic material to penetrate during molding.

The result of utilizing the preferred perforated steel sheeting for the reinforcing structure is to yield an extremely stable laminated structure. As indicated above, the non-metallic material, preferably polyurethane, penetrates the perforations to form on curing a mechanical support for the reinforcing structure. The cured material braces the metallic structure in various ways as, for example, a cross beam is used to brace a beam under compression. At the same time the polyurethane contracts on curing to establish a very tight pre-stressed grip on the metal reinforcing structure. Thus, where the preferred polyurethane is used, the laminated structure is very strong.

The cavities described above not only interrupt the stresses from thermal expansion in what would otherwise be a large solid block of non-metallic material, but also represent a saving in expensive material. Furthermore, depending on the number and configuration of the cavities, they may contribute to the relief of stress through the flexibility of the overall structure.

The metal hub section of the wheel is preferably steel or aluminum with steel most preferred. It is economically more favorable to utilize a thin steel wheel with a rather thicker non-metallic molded wheel section over it.

While a wide range of thermoplastic materials and natural rubber compounds might be suitable for the non-metallic part of the wheel, the preferred material is polyurethane.

The reinforcing structures as indicated are preferably steel. The actual gauge of the metal varies depending on load rating.

The adhesive which may be applied to all metal surfaces prior to molding of the non-metallic material may be chosen from suitable available materials. One preferred adhesive is Bonding Agent 409.

BRIEF DESCRIPTION OF THE DRAWINGS

In drawings which illustrate embodiments of the invention.

Figure 1:
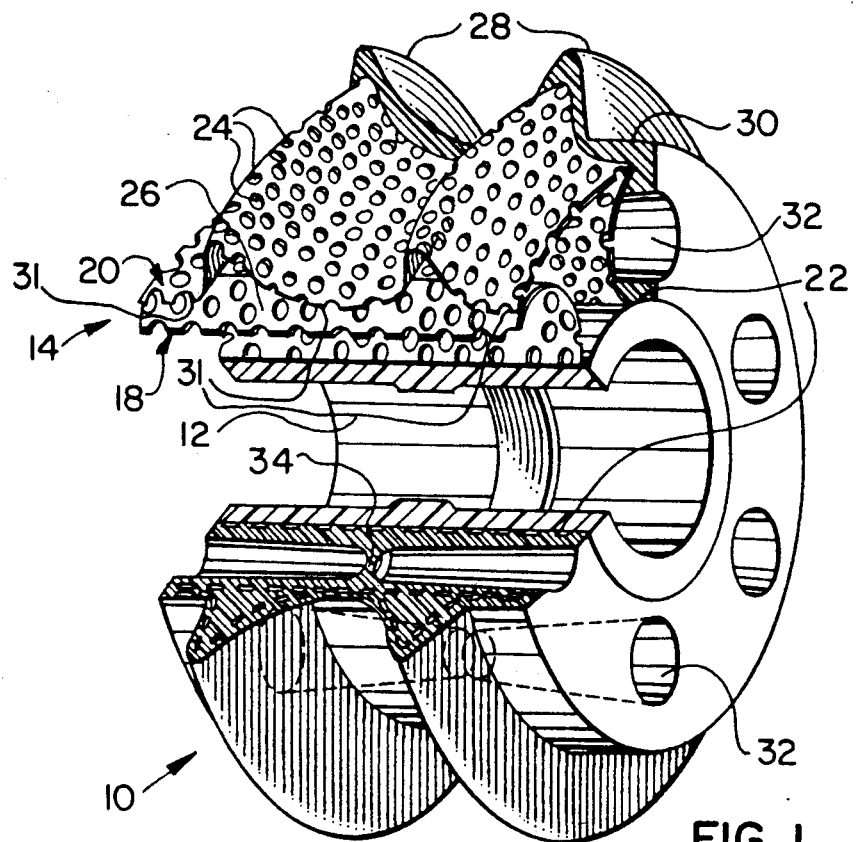
FIG. 1 is a partially cut away perspective view of a tram wheel according to the invention.

While the invention will be described in conjunction with illustrate embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

The tram wheel 10 has as its three major components the hub section 12, the open reinforcing structure or mesh 14 and the molded non-metallic wheel section 16.

The hub section 12 is preferably of steel and is relatively thin.

The reinforcing mesh 14 preferably comprises two sections. The first of these is an inner wheel stabilizing section 18 and the second is the outer flange stabilizing section 20.

Figure 4:
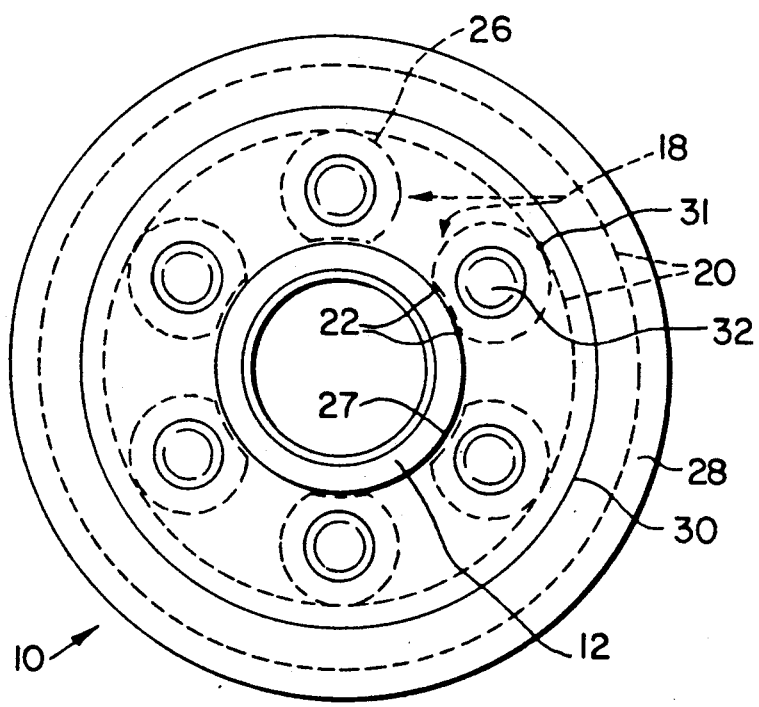
FIG. 4 is an end elevation of a tram wheel according to the invention.

The inner stabilizing section 18 is anchored to hub section 12 by spot welding along the lines of contact 22. As illustrated, the inner stabilizing section 18 is preferably constructed of a perforated steel sheet material having the perforations 24 preferably comprising about 50 to 60 percent of the surface area. As illustrated, the inner stabilizing section 18 comprises a series of cylindrical components 26. These may be depressed along one side to form a larger contact surface 27 (FIG. 4) with hub 12.

The material and configuration of components 26 can be varied over a wide range. For example, a steel net or wire mesh would be suitable in some cases. The configuration must be such as to allow some measure of flexing to accommodate thermal movement.

The inner stabilizing section is intended to hold the non-metallic wheel section 16 immobile to prevent delamination from hub section 12. Nonetheless, because of thermal expansion and other forces, there will be some movement of the non-metallic wheel section 16 as it expands and contracts, twists and the like, and the stabilizing section 18 must be capable of the necessary movement.

The outer flange stabilizing section 20 comprises a similar material to that of Section 18. This section preferably extends into both the cable flanges 28 and the rail flanges 30. In the preferred case the illustrated wavelike configuration is utilized.

The flange stabilizing section 20 is in contact at certain points or lines of contact 31 with the cylindrical components 26. It is spot welded to the cylindrical components 26 to anchor it to them to thereby form a unitary structure i.e. a unitary reinforcing cage, including the hub section 12 and the inner and outer stabilizing sections 18 and 20.

The non-metallic wheel section 16 is molded onto the hub section 12 and incorporates the reinforcing mesh 14. Prior to molding, the outer surface of the hub and the stabilizing mesh or structures 14 are preferably coated with an adhesive or bonding agent to set up a chemical bond between the non-metallic material and the metal parts. Additionally, and to very greatly enhance the strength of the unit, the non-metallic material in the molding process penetrates the perforations in the reinforcing structures to thereby provide a wheel section 16 which is continuous through the perforations 24.

Figure 2:
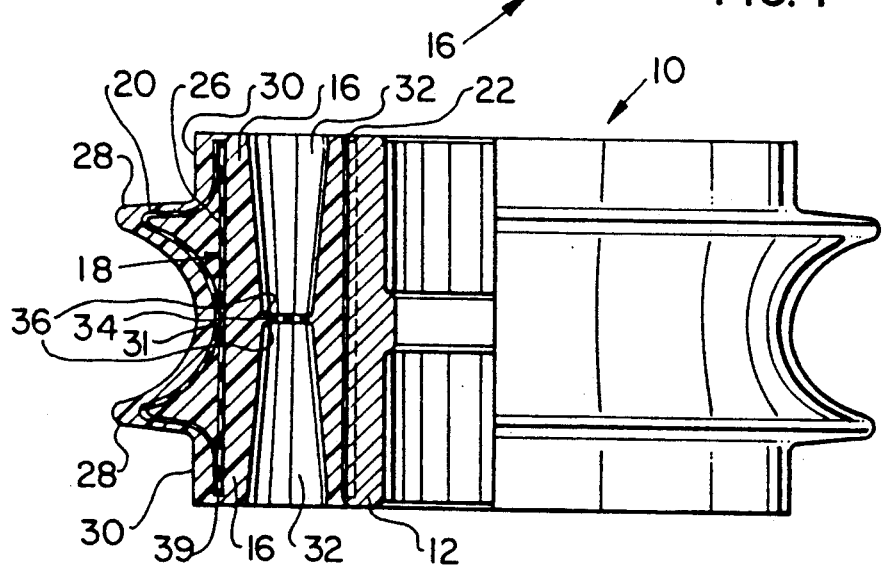
FIG. 2 is a partial cross section through a tram wheel according to the invention.
Figure 3:
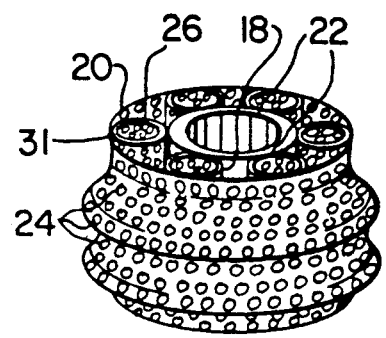
FIG. 3 is a perspective view of a reinforcing structure for a tram wheel according to the invention.

In the preferred case the non-metallic wheel section 16 is provided with a series of cavities 32. The configuration and positioning of these cavities may vary over a wide range. However, preferred configurations are illustrated in FIGS. 2 and 5 to 8. The configuration in FIG. 2 is a basically cylindrical one in which the cavities are formed within the cylindrical components 26. Preferably the cavities are of slightly narrowing cross section proceeding inwardly from the surface of the wheel to provide a truncated slightly conical shape. In the FIG. 2 configuration, a small gap 34 preferably is retained between the inner ends 36 of cavities 32.

FIGS. 5 to 8 illustrate a second preferred configuration in which cavities 32 have been modified in two ways. First, the spacing or gap 34 between the inner ends 36 of cavities 32 has been removed, so that the cavities are continuous through the wheel.

Second, the outer ends 40 in these embodiments comprise a first cylindrical section 42 which is stepped down to a smaller diameter at 44 to the section 46 which then proceeds at decreasing diameter to the joining plane 48.

Figure 6:
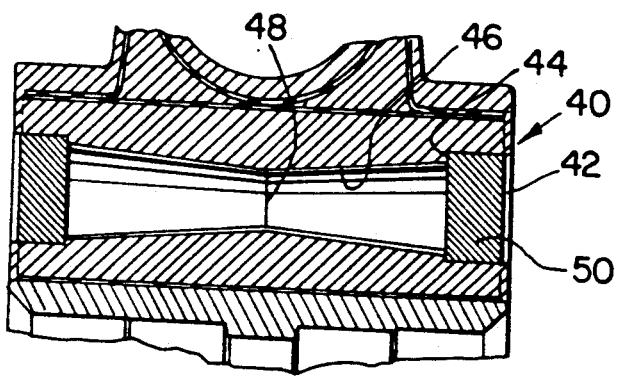

FIG. 6 illustrates an embodiment in which plugs 50 are inserted and secured in the first cylindrical sections 42.

Figures 7, 7A:
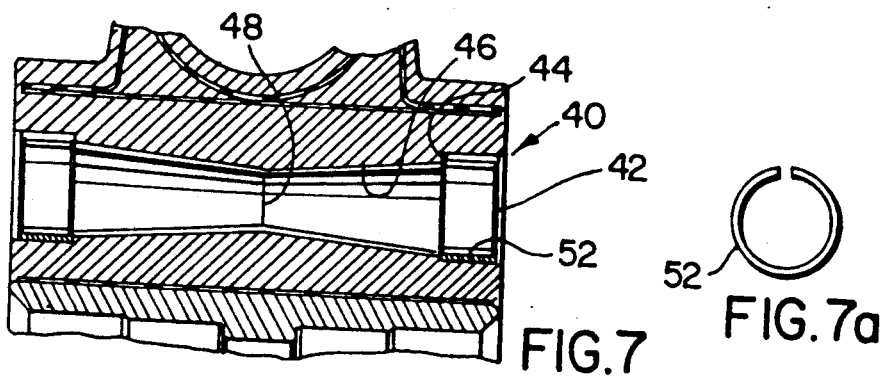
FIG. 7a is a cross section of a spring sleeve for use in the embodiment of FIG. 7.

FIGS. 7 and 7a illustrate an embodiment in which a spring sleeve 52 is inserted into the cylindrical section 42.

Figure 5:
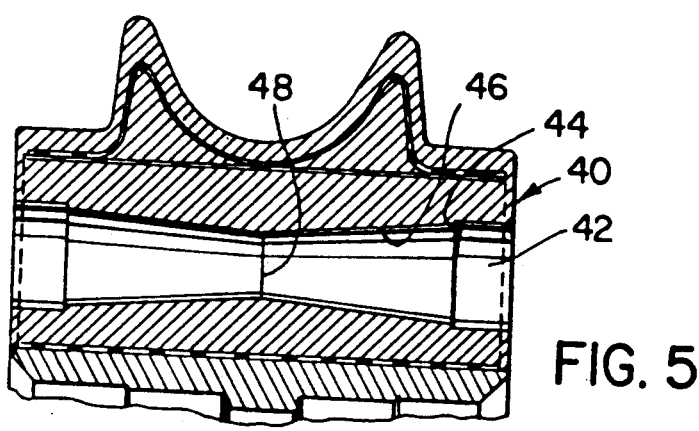
FIGS. 5–8 are cross sections through a part of additional embodiments of a tram wheel according to the invention.
Figure 8:
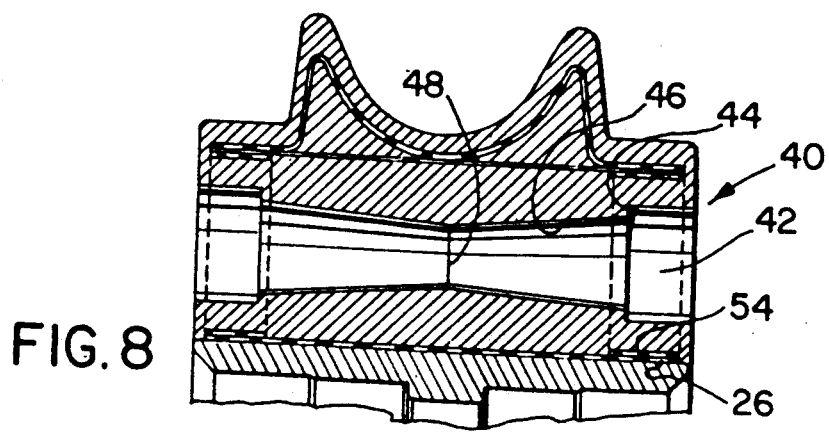

FIG. 8 illustrates an embodiment utilizing a similar cavity system to FIG. 5, but in which an additional reinforcing mesh 54 in the form of a short cylindrical section is spot welded inside the cylindrical component 26.

The FIG. 8 embodiment may be combined with others of the cavity arrangements, and, in particular, may in some cases be useful with the spring sleeve 52 of FIG. 7 and 7a.

The flattened outer sections of wheel section 16 comprise rail flanges 30 on which the wheel 10 will ride at various points in a normal aerial cable system. As illustrated, sections 39 of both inner and outer stabilizing systems 18 and 20 extend into the area adjacent rail flanges 30.

While as discussed above the specific shapes and materials of the components can vary over a substantial range, it is important in all cases that an overall unitary structure be formed in which the components are anchored together into a single unit.

The non-metallic wheel section 16 is preferably polyurethane, although various other thermoplastic and natural rubber compounds will be suitable.

Thus it is apparent that there has been provided in accordance with the invention a tram car wheel that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention is:

1. A tram car wheel comprising
a metallic hub section;
a formed non-metallic wheel on said hub;
a pair of cable flanges on said non-metallic wheel; and
an open reinforcing structure in said non-metallic wheel, said reinforcing structure comprising an inner wheel stabilizing section anchored to said hub section and an outer flange stabilizing section anchored to said inner wheel stabilizing section to thereby form a unitary reinforcing cage, said outer flange stabilizing section extending into said flanges.

2. The tram wheel of claim 1 wherein said inner wheel stabilizing section extends over substantially the axial length of said wheel.

3. The tram wheel of claim 1 wherein said inner wheel stabilizing section has a non-rigid configuration.

4. The tram wheel of claim 3 wherein said inner wheel stabilizing section comprises a series of cylindrical components constructed from perforated sheets.

5. The tram wheel of claim 4 wherein said sheets are metal sheets.

6. The tram wheel of claim 4 wherein said components are oriented axially of said hub and are secured to said hub at spaced positions around said hub.

7. The tram wheel of claim 4 wherein said non-metallic wheel includes therein a series of cavities extending into the interior of said cylindrical components.

8. The tram wheel of claim 7 wherein said cavities comprises first outer cylindrical sections of a first diameter meeting second inner sections of circular cross section, said second sections at their outer ends of a diameter less than said first diameter and of inwardly decreasing diameter, the inner ends of said sections meeting at the mid-point through said wheel.

9. The tram wheel of claim 7 wherein said cavities are of circular cross-section decreasing in diameter inwardly from the end surfaces of said non-metallic wheel to give a truncated slightly conical configuration.

10. The tram wheel of claim 7 wherein said cavities are cylindrical.

11. The tram wheel of claim 7 wherein said cavities comprises outer cylindrical sections meeting truncated conical sections, the narrow ends of said conical sections meeting each other at the mid-point through said non-metallic wheel.

12. The tram wheel of claim 11 wherein the diameter of the wide end of said conical sections is less than the diameter of said cylindrical sections.

13. The tram wheels of claim 12 including cylindrical plugs secured in said cylindrical sections.

14. The tram wheels of claim 12 including spring sleeves secured in said cylindrical sections.

15. The tram wheel of claim 1 wherein said outer flange stabilizing section has a wave-like configuration.

16. The tram wheel of claim 15 wherein said wave-like configuration conforms generally to the contour of said cable flanges.

17. The tram wheel of claim 16 wherein said outer flange stabilizing section is constructed from perforated sheets.

18. The tram wheel of claim 17 wherein said sheets are metal sheets.

19. The tram wheel of claim 1 wherein said non-metallic wheel includes at least one rail flange adjacent said cable flange.

20. The tram wheel of claim 1 wherein said wheel includes at least one rail flange and wherein said outer flange stabilizing section has a wave-like configuration conforming generally to the contour of said cable and said rail flanges.

21. The tram wheel of claim 20 including an additional reinforcing structure within said inner wheel stabilizing structure in the area of said rail range.

22. The tram wheel of claim 1 wherein said formed non-metallic wheel includes a series of cavities therein.

23. The tram wheel of claim 1 wherein said hub section is steel or aluminum.

24. The tram wheel of claim 1 wherein an adhesive is provided on said reinforcing structure and on said hub section wherever said parts contact said non-metallic wheel.

25. The tram wheel of claim 1 wherein said non-metallic wheel is molded of polyurethane.

26. A tram car wheel having a unitary structure and comprising:
a metallic hub;
a non-metallic wheel section molded onto said hub and including at least one of cable or rail flanges;
a reinforcing structure within said non-metallic wheel section and secured to said hub and comprising a wheel stabilizing section and a flange stabilizing section forming a unitary reinforcing cage;
said wheel stabilizing section comprising a series of resilient compressible sections anchored to said hub section; and
said flange stabilizing section having a configuration following generally the contour of said flanges and anchored to said wheel stabilizing section.

27. The tram wheel of claim 26 wherein said reinforcing structure is comprised of perforated metal sheet material.

28. The tram wheel of claim 27 wherein said series of resilient sections are of cylindrical configuration.

29. The tram wheel of claim 27 wherein said metal sheet is steel and said non-metallic section is polyurethane.

30. The tram wheel of claim 29 including an adhesive between said reinforcing structure and said polyurethane.

31. A tram wheel comprising
a metallic hub section;
an open reinforcing structure anchored to and about said hub section; and
a non-metallic wheel section molded about said reinforcing structure and onto said hub to establish a prestressed grip on said reinforcing structure, said wheel section defining a pair of cable flanges and a pair of rail flanges.

32. A tram wheel as set forth in claim 31 wherein said reinforcing structure includes a perforated resilient inner stabilizing section anchored to said hub and an outer stabilizing section anchored to said hub and an outer stabilizing section anchored to said inner stabilizing section and extending within said cable flanges.

33. A tram wheel as set forth in claim 31 wherein said reinforcing structure is made of perforated sheet material.

* * * * *